UNITED STATES PATENT OFFICE.

EZEKIEL CUTTER AND STEPHEN BLANCHARD, OF CINCINNATI, OHIO.

IMPROVEMENT IN ARTIFICIAL MILLSTONES.

Specification forming part of Letters Patent No. 4,753, dated September 10, 1846.

*To all whom it may concern:*

Be it known that we, EZEKIEL CUTTER and STEPHEN BLANCHARD, of Cincinnati, in the county of Hamilton and State of Ohio, have invented a new and useful Manner of Manufacturing Artificial Burr-Stones, to be used in the same way with the natural burr-stones, for the forming or compouning of millstones for the grinding of grain and other articles; and we do hereby declare that the following is a full and exact description thereof.

The value of burr-stones in their application to the purposes of grinding is dependent upon their hardness and upon their peculiar cellular texture, and we have succeeded in giving to our artificial burr-stones both of these properties in an eminent degree. For this purpose we select such natural clay as when subjected to a high degree of heat in a potter's kiln will partially vitrify, and will form that kind of earthenware known under the name of "stoneware;" or we mix with clays of any suitable kind such portions of silex or of other known materials used in the potter's art and in manners well known, or such other earthy or vitrifiable substance as will form a compound possessing the properties which will adapt it to our purpose.

Having prepared our clay or compound of clay and other suitable substance with a sufficient portion of water to bring it into a plastic state, we incorporate with it a large quantity of vegetable matter in a fragmentary or granular state; and as this material is intended to disappear in the process of burning to which the clay is to be subjected, and as the only object of its employment is to give to the artificial burr-stones that cellular texture that is necessary to their proper operation as millstones, we prefer those vegetable substances which have but little density—such as granulated cork, turnips, parsnips, carrots, or other roots of a like character reduced into small but irregular fragments, or the light porous woods in the shape of fine particles mixed with larger fragments, and, in fine, any vegetable or other suitable substance possessing properties which adapt it to this particular purpose. We sometimes use crushed or broken corn and grain of other kinds; but although these substances have answered well, it is more difficult to burn them out from large masses of earthenware than to burn out lighter materials. There is little objection, however, to their use in combination with other substances, such as are above designated. The clay thus prepared with the combustible material diffused in large quantities throughout its whole mass is then to be molded into proper form, and when for millstones of small size they may be molded in one piece; but our intention in general is to form our artificial blocks into segments of such shape and size as will best adapt them to be united together in the manner of the natural burr-stone. The pieces so molded are to be thoroughly dried and then baked in a potter's kiln, being subjected to that degree of heat which is necessary to give them the requisite hardness; and in undergoing this process the vegetable matter will be burned out, provided a sufficient quantity of it has been mixed with the clay to give to it the proper cellular texture throughout.

We are fully aware that vegetable substances have been incorporated with clay for the making of bricks and probably for other purposes, either to aid in the burning of the material or in the merely rendering it porous; but in our use of such materials it is important to imitate that irregular form of the pores which belongs to burr-stones, and which pores must be produced by fragmentary substances, such as are herein described.

Having thus fully set forth the nature of our new manufacture of artificial burr-millstones and shown the manner in which we effect the same, what we claim therein as new, and desire to secure by Letters Patent, is—

The preparing of such artificial burr-stones by incorporating with clay or such earth as is fitted for making the harder kinds of pottery a large portion of fragmentary vegetables or such other suitable matter as will cause the said clays when burned to be filled with pores of the kind by which it is adapted to take the place of the natural burr-stones, the whole procedure and operation being substantially the same with that herein fully made known.

EZEKIEL CUTTER.
STEPHEN BLANCHARD.

Witnesses:
DAV. T. SNELLBAKER,
W. M. NAUDAIN.